310-369 SR

OR 3,694,677

X 89365

(2)

United States Patent [15] 3,694,677

Guttwein et al. [45] Sept. 26, 1972

CROSS REFERENCE

[54] VHF-UHF PIEZOELECTRIC RESONATORS

[72] Inventors: Gunter K. Guttwein, West Long Branch; Arthur D. Ballato, Long Branch; Theodore J. Lukaszek, Ocean, all of N.J.

[73] Assignee: The United States of America as represented by the Secretary of the Army

[22] Filed: March 3, 1971

[21] Appl. No.: 120,390

[52] U.S. Cl. ........................310/9.6, 310/9.4, 333/72

[51] Int. Cl. ..............................................H01v 7/00

[58] Field of Search...........310/8.5, 8.6, 8.8, 9.1, 9.2, 310/9.5, 9.6, 9.4; 333/72

[56] References Cited

UNITED STATES PATENTS

| | | | |
|---|---|---|---|
| 3,585,418 | 6/1971 | Koneral | 310/9.6 |
| 3,576,453 | 4/1971 | Mason | 310/9.5 |
| 3,363,119 | 1/1968 | Koneral et al. | 310/9.5 |
| 3,382,381 | 5/1968 | Horton | 310/8.5 X |
| 3,396,287 | 8/1968 | Horton | 310/9.1 |
| 3,569,750 | 3/1971 | Beaver | 310/9.5 |
| 2,498,737 | 2/1958 | Holden | 310/9.6 X |

*Primary Examiner*—R. F. Staubly
*Assistant Examiner*—B. A. Reynolds
*Attorney*—Harry M. Saragovitz, Edward J. Kelly, Herbert Berl and Charles F. Gunderson

[57] ABSTRACT

This disclosure relates to crystals and particularly to very high frequency crystals. More particularly, this disclosure relates to techniques for increasing the fundamental resonant frequency of crystals beyond the limits of currently available mechanical techniques by reducing the thickness of a portion of the center of a standard crystal. This provides an effective resonant sector of an area and thickness that would be virtually impossible to manufacture or to mount by conventional techniques or use in existing mechanical structures.

4 Claims, 4 Drawing Figures

INVENTORS,
GUNTER K. GUTTWEIN,
ARTHUR D. BALLATO &
THEODORE J. LUKASZEK
BY
Charles F. Gunderson AGENT
Harry M. Saragovitz, Edward J. Kelly &
Herbert Berl
ATTORNEYS.

VHF-UHF PIEZOELECTRIC RESONATORS

BACKGROUND OF THE INVENTION

Crystals are well known and crystal resonators are an essential element in frequency control techniques. They are used for stabilizing the frequency of oscillators as well as for establishing the frequency of filters and other devices. These crystals rely on a piezoelectric effect to translate mechanical strain of the crystal body to electrical signals between opposing surfaces of the crystal or vice versa. Electrodes are applied to these opposing surfaces to apply or detect the electrical signals.

The techniques for cutting or grinding crystal blanks are well known, as are the optimum orientations with respect to crystal axis, to obtain the various cuts for maximum temperature stability, frequency accuracy and mechanical strength. The faces or surfaces of the crystal blanks must be processed as accurately as possible and electrodes must be formed on opposing sides of the center of the resonator surface and extend to terminal contacts at the edge of the crystal for electrical couplings into desirable circuits.

The crystal is a fundamental element in frequency control. As the frequency requirement reaches more and more into the high frequency spectrum, the limitations of present crystal devices becomes apparent. The fundamental frequency of a crystal vibrating in a thickness shear mode is primarily dependent upon the thickness of the crystal blank. The thinner the cross section or spacing between electrodes, the higher the fundamental frequency.

The problems in making higher frequency crystals are mainly mechanical. The crystal blank cannot be cut or ground without a certain risk of damage. The higher the fundamental resonant frequency, the thinner the resonant crystal and the greater the fragility. The more fragile crystals cannot be manufactured without an increasingly high risk of damage, regardless of the method of manufacture, nor can they be handled or mounted without the same, very-high risk of damage. Furthermore, the risk of damage by external shock or vibration would be very much higher with any conventional mounting of a very fragile crystal.

If the crystal must ultimately be held between two edge-clamping, mechanical terminals, there is a limit beyond which the crystal blank becomes too fragile to be held mechanically or mounted or used in a practical holder. Crystals are commercially available with fundamental frequency only in the order of 30 megahertz and, while crystals can be custom ground to approximately 40 megahertz, the cost and percentage of failures of manufacture of crystals becomes increasingly higher as the fundamental resonant frequency increases.

Harmonics may, of course, be used and are very often used to achieve higher frequencies with commercially-available crystal devices. However, the electrical and other characteristics of the crystal resonator are altered at the higher harmonics and the higher the harmonic, the weaker the available signal. The change in electrical characteristics noticeably restricts the bandwidth, which is undesirable, particularly in some filter applications. These changes also reduce the pulling range for voltage controlled or temperature controlled oscillator applications.

It is therefore an object of this invention to provide a crystal resonator having a higher fundamental frequency.

It is a further object of this invention to provide a crystal having improved mechanical strength and stability for a given physical dimension.

It is a further object of this invention to provide a crystal having improved stability and resistance to mechanical and thermal shock.

SUMMARY OF THE INVENTION

These objects are achieved by using a crystal resonator of conventional size and shape that can be mounted in a well-known manner. A substantial portion of the central area of this crystal resonator is cut away, by etching or other means, on one or both sides, to provide a smaller, thinner, crystal resonator. This new crystal resonator within the larger crystal blank can be of a size and thickness that would be so fragile that, by itself, it could not be handled in a routine manner or mounted in conventional brackets. The homogeneous nature of the crystal body provides uniform expansion and contraction and inherent resistance against thermal shocks, and the large peripheral contact between the inner portion of the crystal resonator and the outer portion provides a very strong physical mounting around the entire periphery of the vibrating portion instead of at two discrete points as in the normal mounts. The size and thinness of the central portion of this crystal area provides very much higher fundamental frequencies than would be possible by presently available crystals.

DETAILED DESCRIPTION OF THE PREFERRED EMBODIMENT

Figure 1:
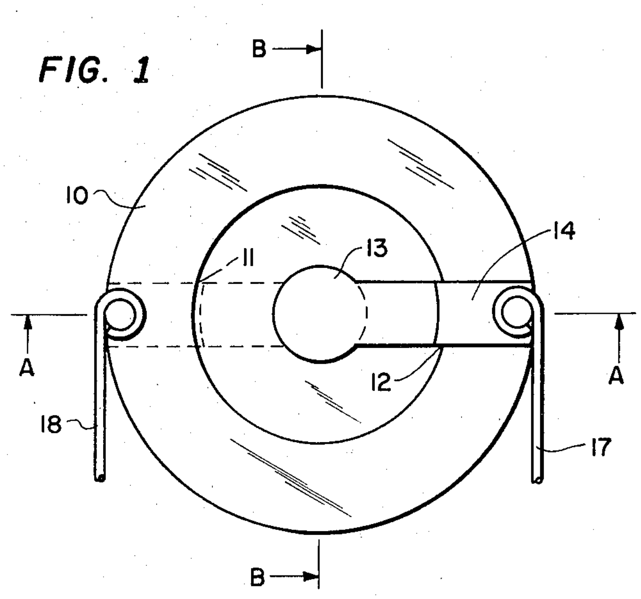
FIG. 1 shows a plan view of a preferred embodiment of this crystal resonator in its mounting brackets.

Referring now more particularly to FIG. 1, a crystal blank 10 has a circular central portion cut out, along the lines indicated by 11 and 12, to form a smaller crystal resonator. The relative depth of this cut will be more clearly indicated in the cross sections of FIGS. 2–4. The crystal resonator has two opposing electrodes of which 13, on the facing side, is visible. This connects to a terminal 14 on the outer edge of the crystal blank. This terminal is held by a conductive mounting bracket 17 for coupling to any desired utilization circuit. A conductive mounting bracket 18 holds the outer edge of the crystal blank on the other side and makes contact with the terminal of the opposing electrode, which is not seen, and is shown in dotted lines.

Figure 2:
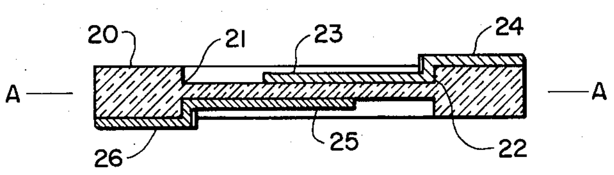
FIGS. 2 and 3 show two of the embodiments of this crystal resonator in cross section.

FIG. 2 shows a cross section of the device of FIG. 1, along the lines A—A, through the electrodes and their terminals with similar parts similarly numbered. This more clearly shows the sunken central portion between the points defined by the edges 21 and 22 which correspond to the lines 11 and 12 of FIG. 1. In FIG. 2, the crystal 20 has an upper sunken portion between the edges 21 and 22. The electrode 23 again extends to the terminal 24 at the outer edge of the crystal blank. The conductive mounting brackets 17 and 18 shown in FIG. 1 are omitted here for simplicity. An opposing electrode 25 is visible in this cross section, and extends to the terminal 26 at the outer edge. The electrode 25, in this species, is also in a lower, sunken, central portion that corresponds to the upper sunken portion between the edges 21 and 22.

Figure 3:
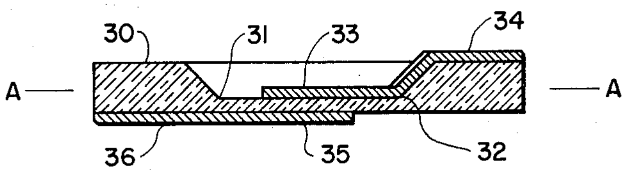

FIG. 3 shows a cross section of another species of this invention with the sunken portion only in the upper surface. The crystal blank 30, again, has a sunken portion between the edges 31 and 32. These edges of the sunken portion may be sloped outward as shown, and the cut-out portion is deeper to achieve the same thin resonating portion. The electrode 33 connects to the outer-edge terminal 34 and the opposing electrode 35 connects to the other outer-edge terminal 36.

Figure 4:
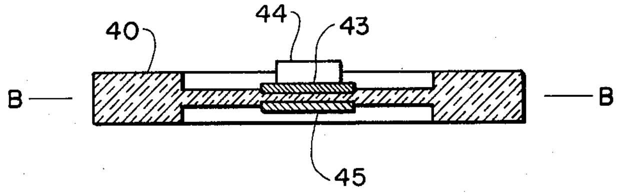
FIG. 4 shows a cross section of another embodiment of this invention.

FIG. 4 shows an additional concept; the cross section of FIG. 4 is along the lines B—B of FIG. 1, and is across the electrode portion only, rather than being through the terminals, to more clearly show this concept. FIG. 4 shows the crystal blank 40 with an electrode 43, in the upper sunken portion, connecting to the outer-edge terminal 44. An opposing electrode 45, whose connecting terminal is not visible, is in the lower sunken portion.

The additional concept seen in FIG. 4 is that the electrodes 43 and 45 are further embedded into the central, sunken portion of the crystal resonator. The sunken electrodes are for applications where additional control of motional parameters — such as attainment of a high-quality factor (Q) or suppression of interfering modes — is essential.

In this concept, a phenomenon called energy trapping is employed, and this technique provides a means of achieving energy trapping with thicker electrodes, thus providing greater conductivity and lower losses without excessively increasing the mass loading of the central vibrating portion of the crystal resonator. Energy trapping has been used extensively for filter and oscillator applications and the effect is well known.

In operation, the crystal blank is mounted in a normal crystal holder which would include conductive mounting brackets such as 17 and 18. The resonator functions as a normal, edge-clamped, crystal disc except that the vibrating portion of this resonator is confined to the central, sunken, disc portion between the edges, such as 21 and 22, of FIG. 2. The electric current is conducted to or from the electrode portions 23 and 25 to the terminals 24 and 26.

The crystal blank for this device may be of any well known material, such as quartz or, alternatively, of such materials as lithium niobate, or zinc oxide. It may also be made of ferroelectric ceramics, such as the barium titanates or zirconium titanates. These are more difficult to lap to the required dimensions by conventional processes because of their brittleness.

The sunken, central portion for this device may be ground by mechanical techniques or it may be etched by chemical or ionic techniques. Mechanical grinding techniques are very well known but are relatively hard to control and would present more difficulty in maintaining the opposing sunken surfaces parallel. Mechanical techniques would also be increasingly prone to damage the crystal resonator as it becomes thinner and more fragile.

Chemical etching is also very well known. It is relatively rapid, and virtually harmless, mechanically, but the quality of the etch might reflect the preferential erosion by the chemicals due to impurities or strains in the crystal lattice and the resultant surface may also have pit holes from residual acid and suffer from progressive aging degradation.

The best method would be ion etching, where a beam of ions is directed at an unmasked area of the crystal as described in a paper entitled "Mode Control and Related Studies of VHF, Quartz Filter Crystals" by T. J. Lukaszek, in the Proceedings of the Annual Symposium on Frequency Control, given at Atlantic City, N. J. in April 1970. Cyclotronic beams or laser beams may also be used for etching out the center, sunken portion or the additionally sunken portions shown in FIG. 4 to embed the electrodes 43 and 45.

It is also obvious that a combination of two or more etching or grinding techniques may be used to increase the speed of forming the sunken portion or to improve the quality of the final surface. This may be particularly applicable to additional etching of the electrode area to embed the electrodes, as shown in FIG. 4, which may need an even more carefully controlled etching process than the main portion.

The electrodes themselves, in any of the species, are conventional and may be made of any conductive material deposited onto the correct portions of the crystal resonator surface in a well known manner. The conductive material usually extends from the opposing center portions of the vibrating area of the edge-clamped disc to the edge of the disc, usually on opposing sides for maximum separation, for electrical terminal contacts.

The mounting of the crystal resonator is also conventional since the basic crystal blank 10 is of a standard size and shape and the edge terminals are conventional. The mounting techniques usually include edge clamping of the crystal body between two conductive mounting brackets such as 17 and 18 of FIG. 1 that are strong enough to hold the crystal and, in some cases, may be resilient enough to protect the very fragile crystal from mechanical shock damage. These conductive brackets make contact with the terminal portions of the electrodes at the edges of the crystal blank and connect them to a utilization circuit.

The encapsulating and mounting of the entire crystal structure would be conventional and in accordance with the intended use of the device.

The homogeneous, continuous, mechanical edge coupling between the outer edge portion and the sunken central portion provides the best, the strongest, and probably the only way of mounting such an extremely delicate crystal resonator. This virtually eliminates mechanical stress between crystal and mount, from thermal expansion and contraction or any other cause, and reduces the problems and the cost of meeting tolerances in the machining of such very delicate crystal structures.

While this crystal provides a very-much-higher, fundamental resonant frequency than would be practical, or even possible, in conventional crystal blanks, this does not limit the use of this crystal to such fundamental frequencies. Harmonic frequencies will be generated by this crystal resonator and may be used advantageously in a well known manner to achieve still higher frequencies. The harmonics would, of course, still decrease in effectiveness as their harmonic order increased.

The conventional, circular shape of crystal blank is shown here and the sunken, edge-clamped, vibrating portion is also circular. However, other shapes are known and could be used here, with predictable changes in the mechanical and the electrical characteristics of the resonant crystal.

The shapes of the edges around the sunken portion may also be varied for mechanical and electrical reasons as well as for convenience of manufacture. They may be vertical as seen in FIGS. 2 and 4 or sloped as in FIG. 3. They could also be curved, in a manner not shown, to avoid mechanically-weak sharp edges.

In a typical embodiment of this invention, a standard crystal blank that is 8mm in diameter and 55.3 microns thick — that would normally have a fundamental resonant frequency of 30 megahertz — has a center portion of 5mm in diameter with its thickness reduced to 16.6 microns and has a resonant frequency of 100 megahertz. The opposing electrodes may be 1,200 angstrom units thick and may be embedded to about 1,000 angstrom units into the opposing sides of the center portion.

We wish it to be understood that we do not desire to be limited to the exact details of construction shown and described, for obvious modifications will occur to a person skilled in the art.

What is claimed is:

1. A modified piezoelectric crystal comprising a homogeneous crystal blank having an outer portion of a given diameter and a given thickness suitable for mounting in one of the available mounting brackets, and a center portion of a thickness less than two thirds of said given thickness of said outer portion, said center portion being of a thickness and a diameter that could not be accommodated in said available, mounting bracket; a first terminal mounted on one edge of said outer portion; a second terminal mounted on the opposing edge of said outer portion; a first electrode attached to the surface of one side of said center portion and extending to said first terminal; a second electrode opposing said first electrode attached to the surface of the other side of said center portion and extending to said second terminal; and means for connecting a utilization circuit to said first and second terminals the frequency of oscillation of said center portion being at least 50 percent greater than that of an unmodified crystal of said given thickness and said given diameter.

2. A piezoelectric crystal as in claim 1 wherein one of said sides of said center portion is level with the corresponding side of said outer portion.

3. A piezoelectric crystal as in claim 1 wherein said one side of said center portion is below the level of the corresponding side of said outer portion, and said other side of said center portion is below the level of the corresponding side of said outer portion.

4. A piezoelectric crystal as in claim 1 wherein the diameter of said center portion is two-thirds of the diameter of said outer portion, and the thickness of said center portion is one-third of the thickness of said outer portion.

* * * * *